Dec. 1, 1931.  W. K. SONNEMANN  1,834,432
SYSTEM OF ALTERNATING CURRENT DISTRIBUTION
Filed Jan. 5, 1929  5 Sheets-Sheet 1

INVENTOR
William K. Sonnemann
BY
ATTORNEY

Dec. 1, 1931. W. K. SONNEMANN 1,834,432
SYSTEM OF ALTERNATING CURRENT DISTRIBUTION
Filed Jan. 5, 1929 5 Sheets-Sheet 2

INVENTOR
William K. Sonnemann
BY
ATTORNEY

Dec. 1, 1931.  W. K. SONNEMANN  1,834,432
SYSTEM OF ALTERNATING CURRENT DISTRIBUTION
Filed Jan. 5, 1929   5 Sheets-Sheet 3
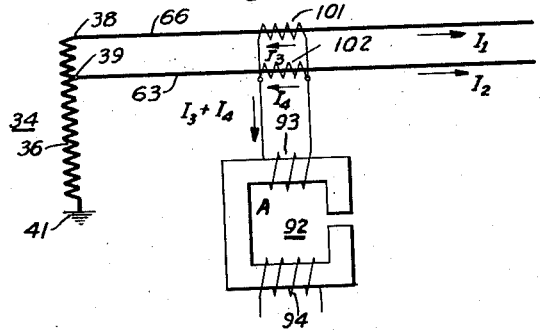
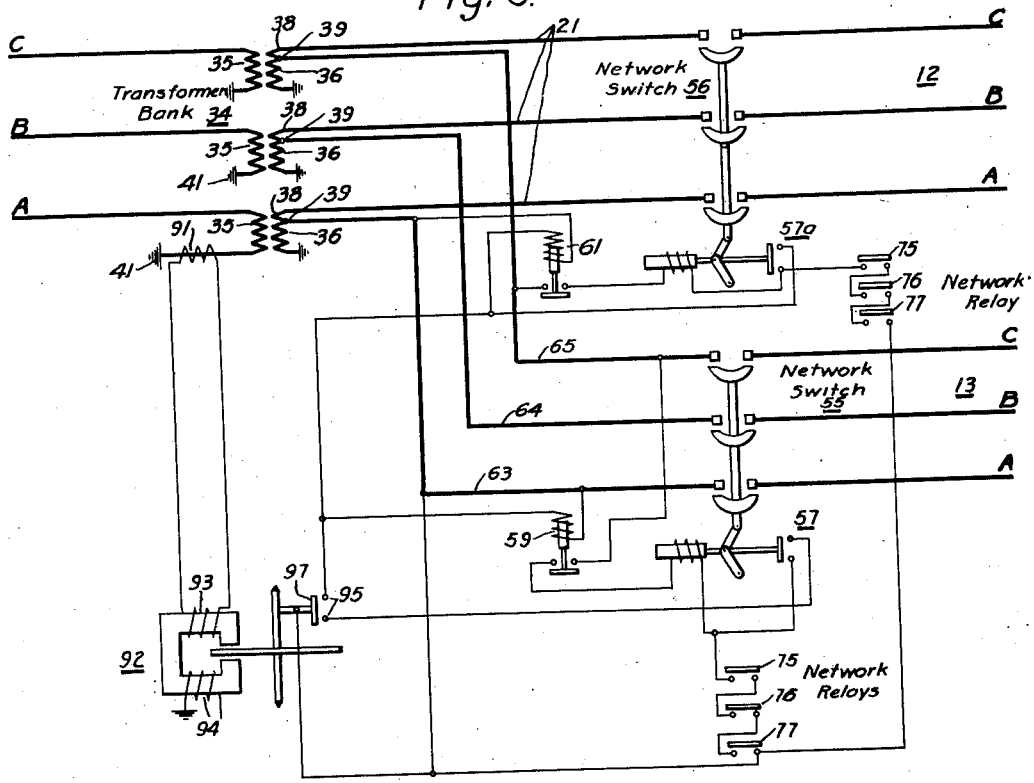
INVENTOR
William K. Sonnemann
BY
ATTORNEY Patented Dec. 1, 1931

1,834,432

UNITED STATES PATENT OFFICE

WILLIAM KNOX SONNEMANN, OF NEWARK, NEW JERSEY, ASSIGNOR TO WESTINGHOUSE ELECTRIC & MANUFACTURING COMPANY, A CORPORATION OF PENNSYLVANIA

SYSTEM OF ALTERNATING-CURRENT DISTRIBUTION

Application filed January 5, 1929. Serial No. 330,593.

This invention relates to systems of alternating-current distribution and particularly to means for preventing improper action of low-voltage network switches by reason of auto-transformer action. By auto-transformer action is meant the transfer of energy at different voltages from one low-voltage conductor to another low-voltage conductor connected to the same transformer winding.

The principal objects of this invention are as follows:

To provide a means and a method of preventing improper action of a network switch by reason of auto-transformer action.

To provide a network system of distribution utilizing a plurality of secondary voltages to energize a plurality of networks.

To prevent the occasional opening and closing of network units connected to a plurality of networks all energized from, and interconnected through, a plurality of transformer banks, when a reversal of power occurs from one network by reason of auto-transformer action between the networks.

Heretofore, the apparatus utilized in systems of this general type had certain limitations and disadvantages, the principal ones of which were as follows:

A sudden or heavy load drawn from one network was frequently of such magnitude as to cause a so-called auto-transformer action; that is, the lighter-loaded network tended to assist in carrying the load on the heavier-loaded network through the tapped secondary winding of the transformer. This action resulted in a reversal of energy flow through the network switch connected to the lighter-loaded network so that, with the usual scheme of control heretofore used, this switch or breaker would open. When conditions were restored to normal, the breaker would reclose. A good illustration of this action may be had in considering the effect of large elevator motors on one network which, by their intermittent use, frequently caused intermittent operation of either or both network switches associated with the elevator motors, depending upon the condition of the switches before the elevator motor was started. Assuming that the switch connected to the network supplying the motor load is closed and also that the switch connected to the other network also is closed, the sudden starting of the large elevator motor, while maintaining the network switch supplying it in the closed position, may result in the undesirable tripping of the other network switch.

Or, assuming that a network switch supplying the motor network is open because of a light-load condition of this network at the time the elevator motor is started, the starting of the motor may reduce the voltage of this network to such a point as to cause the network switch in the immediate vicinity to close, after which the network switch supplying the other network may undesirably open because of the auto-transformer action.

It may be observed that, in both these assumed cases of an improper action, there has been a transfer of energy between conductors at different voltages connected to the secondary mains but there is no reversal of power direction through the transformer itself.

In the present invention, means are provided which are operative in response to the direction of power flow through the transformer to control the energization of the networks. By so doing, the improper operation of either network switch may be prevented as long as the direction of energy or power flow through the transformer is in the normal directions; namely, from the bus through the distribution transformer, through either or both network switches, to either or both networks, assuming two networks.

Schemes utilized heretofore for overcoming the so-called auto-transformer action seriously impaired the normal action of the network-switch-controlling means. For example, when a feeder is de-energized by opening the oil switch or circuit interrupter at the high-voltage source, the network switches are normally expected to trip in response to the flow of magnetizing energy from the network into the transformer bank. Where auto-transformer action exists, this energy may be supplied wholly from one network, so that the relays actuating this network switch will operate to trip. The power flow toward the network through the other switch, due to the auto-transformer action, may undesirably serve to keep the network relays controlling this network switch in the closed position.

One scheme heretofore employed involves a parallel connection between the contacts of both sets of relays so that the contact circuit must be opened by at least one relay in each set; thus, an auto-transformer action on all 3 phases, by keeping one set of relay contacts closed, will prevent both switches from opening when the feeder is de-energized at the high-voltage source by opening the oil switch or circuit interrupter. Another undesirable feature of this scheme is that the time characteristics of the network-switch-controlling relays must be utilized in order to prevent false operation of the network switches in response to a sudden reversal of the direction of the auto-transformer action. In this invention, both of these limitations have been eliminated.

In the drawings—

Fig. 5 is a schematic diagram showing an alternate means for energizing a reverse-power relay in this system;

Fig. 6 is a line diagram showing the simplified connections for the system shown in Fig. 5;

Figure 3:
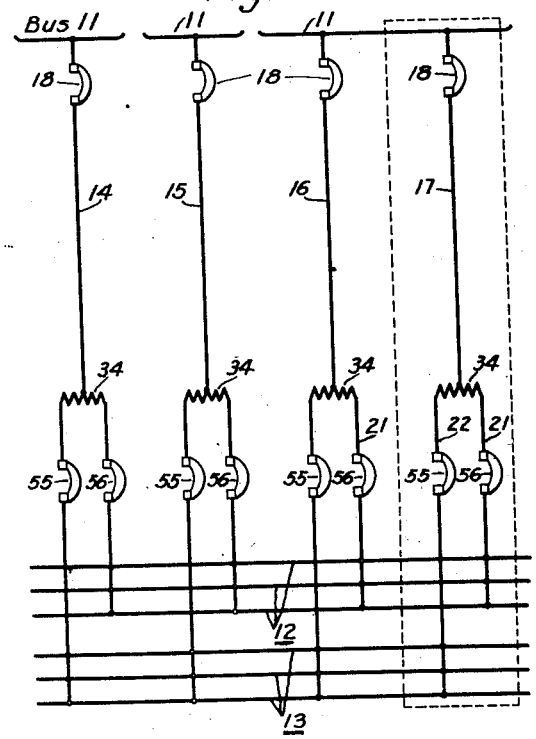
Fig. 3 is a line diagram of a distribution system.

The general arrangement of a network system embodying the present invention is illustrated diagrammatically in Fig. 3. Source or sources 11 of high-tension energy or power, which may be supplied from a generator bus or a substation bus, are utilized to furnish energy to a plurality of low-voltage networks 12 and 13. Disposed between the networks or work circuits or load circuits or inter-connected meshes 12 and 13 and the busses 11, are the usual distribution transformers 34 energized from the busses by the feeders 14, 15, 16 and 17.

The devices 18 are circuit interrupters for disconnecting the feeders 14, 15, 16 and 17 from the busses 11. The circuit interrupters may be of the usual over-current or over-load type.

The transformers 34 may be individual banks of step-down transformers, depending upon the number of phases and the particular connections. It should be observed that the transformers energize the networks 12 and 13 at different voltages and, accordingly, are provided with taps for that purpose.

Between each network 12 and 13 and the transformer banks 34 are installed the so-called network switches or network breakers or circuit interrupters 56 and 55, which are utilized to control automatically the connections of the transformers 34 to the networks 12 and 13 by opening and closing the circuit interrupters 18 at the stations 11 or by the effect of a fault condition relative to the transformers 34 or any of the feeders 14 to 17, inclusive. Fault conditions, occurring relative to the networks 12 and 13, are assumed to be permitted to burn clear, in accordance with the usual practice.

In this particular example, the network 12 is called the "power network", as it may be used to energize a power load, and the network 13 is called the "lighting network", being used to energize the lighting load. The "light" and "power" designation is used by way of example although either or both of the networks 12 and 13 might be utilized to energize either form of load. One of the essential features of this scheme is the utilization of a common transformer bank 34 to energize a plurality of networks 12 and 13 at different voltages, the connections between the common transformer bank and the plurality of networks 12 and 13 being controlled by the network switches 55 and 56 respectively.

The use of the plurality of networks 12 and 13, energized from the single transformer bank 34, introduces the problems of eliminating or canceling the effect of a transfer of energy that may take place between the two networks 12 and 13, thus causing false operation of the network switches 55 and 56.

Therefore, in this invention, means are provided for supervising the network-switch-control means in such manner that the transfer of energy between the networks 12 and 13 at different voltages is canceled or negatived or rendered ineffective to cause false operation of the network switches 55 and 56.

To accomplish this result, means are provided which are responsive to the direction of resultant power flow through the transformer bank 34 for supervising the network-switch-control means so that the network switches 55 and 56 associated with a particular feeder will open only upon conditions of reversal of resultant power through both switches 55 and 56, or through the transformer 34, and will not open upon a condition of reversal of power in one only of the secondary mains.

For example, assuming that the network 13 is being fed by energy from the feeders 14 to 17, inclusive, and likewise the network 12 is being energized in a similar manner except at a different voltage, and assuming a condition whereby a transfer of energy occurs between the network 12 and the network 13, so that the network 13 is energized, in part, by current from the network 12, a reversal in direction of power flow in the secondary main 21 will occur, and current will flow in the normal direction in the secondary main 22, the latter deriving its energy from the feeder 17 in the normal direction and from the secondary main 21 in a direction reverse from the normal.

Under these circumstances, with control devices heretofore used, the reversal of energy flow in the secondary main 21 might cause the network switch 56 to open and, if such operation were frequent, the result would be very objectionable. To overcome this objection, in accordance with the present invention, means are provided to cancel the effect of such transfers of energy between networks connected to a common transformer bank. As a specific example of such means, a reverse-energy relay or power-directional relay is provided which will respond only to the resultant power flow through the transformer bank 34 and will be unaffected by reversals of power connected to the secondary mains, such as the mains 21 and 22, unless such secondary reversals also cause a reversal of resultant power through the transformer bank.

Figure 1:
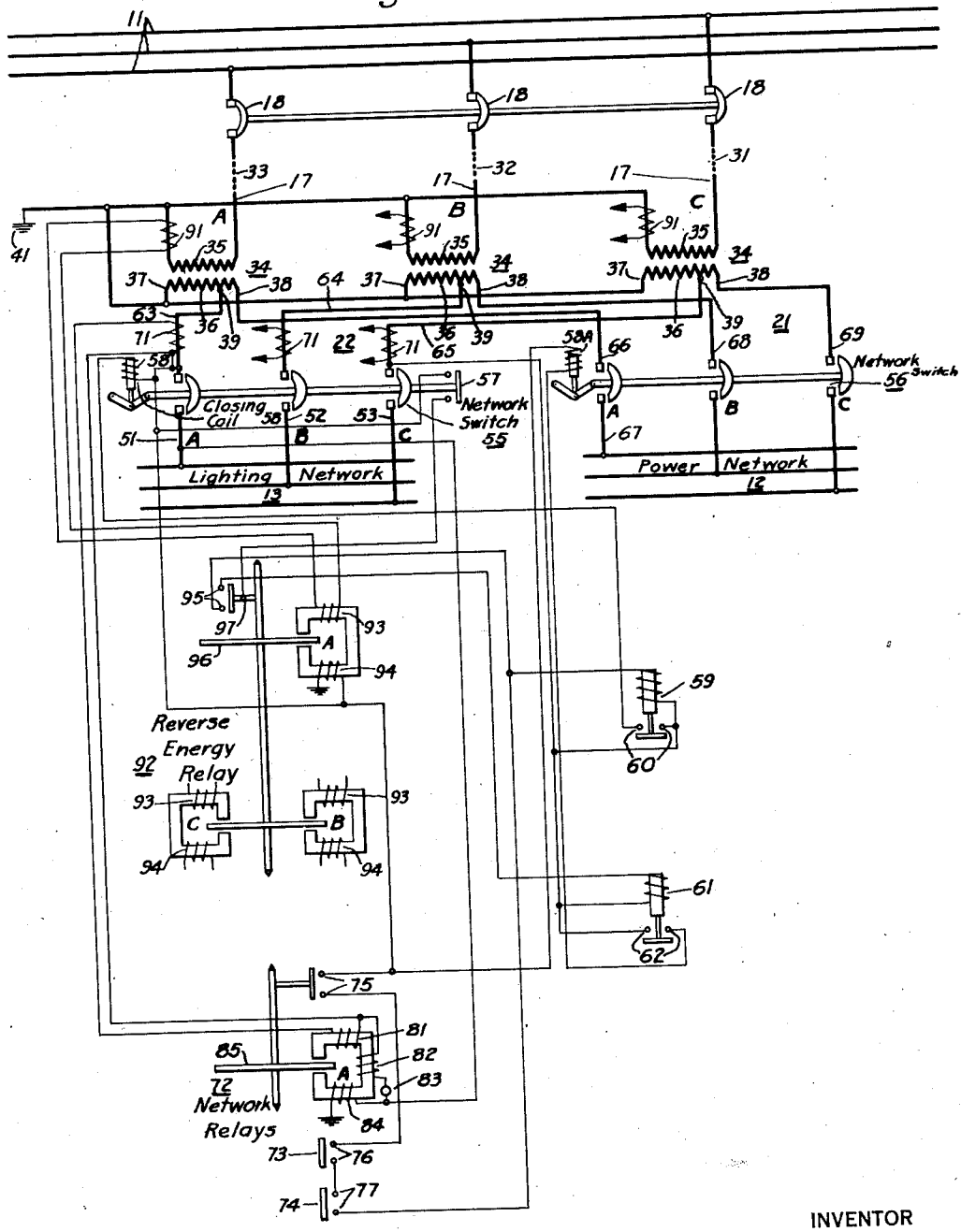
Figure 1 is a diagram showing a system of alternating-current distribution, including means for preventing repeated unnecessary opening and closing of network switches which are connected to the same transformer bank.

Fig. 1 illustrates the portion enclosed by the dotted line of the complete system illustrated in Fig. 3. It is to be understood that the elements illustrated in Fig. 1 may be associated with any of the feeders 14, 15, 16 and 17 of Fig. 3, but, by way of example, it is here illustrated as associated with the feeder 17, and the reference numerals employed have the same significance as those of Fig. 3.

The substation bus or generator bus 11 delivers energy to the high-tension feeder 17 which, in this example, is a three-phase feeder, the conductors of which are designated as 31, 32 and 33. The feeder conductors 31, 32 and 33 are respectively connected to normally energize step-down transformers 34 which may be a single transformer or a bank of transformers suitably connected and constructed according to the requirements of the particular power system.

At the station end of the feeder 17, a circuit interrupter 18 is disposed for controlling the connections of the feeder 17 to the bus 11. The circuit interrupter 18 may be an ordinary circuit interrupter of the overload type.

The transformers 34 may be of a usual construction having primary windings 35 connected to the respective feeder conductors 31, 32 and 33 and to ground 41 and having secondary windings 36, with the usual end terminals 37, 38 and a tapped connection 39. The terminal 37 is connected to the ground connection 41. The terminal 38 is connected to the network 12, associated with the switch 56, which is to be energized at one voltage, and the terminal connection 39 is connected to another network 13, associated with the network switch 55, which is to be energized at a different voltage. The purpose of the transformers 34 is to furnish energy to a plurality of networks at a plurality of different voltages. Another purpose, indirectly, is to furnish a load, by reason of the magnetizing qualities of the transformers, to actuate the relays 72, 73 and 74 under conditions where the feeder conductors 31, 32 and 33 are disconnected from the end associated with the bus 11 or are subjected to a fault condition.

The power network 12 is energized from the terminals 38 by means of the secondary mains 21 which, in this three-phase system, comprise the three conductors 66, 68 and 69, corresponding to phases A, B and C, respectively.

The lighting network 13 is energized from the taps 39 of the transformers 34 by means of a secondary main 22 and comprises phase conductors 63, 64 and 65 on the transformer side of the network switch 55, and the conductors 51, 52 and 53 on the network side of the network switch 55.

Although it is not so shown in Fig. 1, the network 12 and also the network 13 are both energized from a plurality of sources of power, as shown in Fig. 3.

Disposed between the transformers 34 and the lighting network 13 is a so-called network switch 55 which may be an automatic network protector of the usual type.

Similarly disposed between the transformers 34 and the power network 12, a network switch 56 in the secondary main 21 which, likewise, may be of the usual construction.

The network switch 55 is provided with an auxiliary switch 57 which closes when the switch 55 is closed and opens when the switch 55 is opened; the operation of the auxiliary switch 57 being responsive to the mechanical motion of the switch 55.

When the switch 55 is closed, the auxiliary switch 57 supplies a potential to the movable contact 97 of a reverse-energy relay 92, hereinafter described.

The network switch 56 is not provided with an auxiliary switch in the present embodiment of the invention, but, as hereinafter described with reference to the embodiment illustrated in Fig. 6, such an auxiliary switch may be provided.

Associated with the switch 55 is the usual closing coil 58 which is controlled by a low-voltage relay mechanism 59.

The low-voltage relay may be of the usual solenoid type having the operating winding thereof connected in series-circuit relation with the contacts 75, 76 and 77 of the network relays 72, 73 and 74. In the present example, the energizing circuit extends from the feeder conductor 65 on the transformer side of the network switch 55, to the coil of the relay 59, thence through the contacts 77, 76 and 75, in series, and thence to the feeder conductor 63 in the transformer side of switch 55.

It is apparent, therefore, that the operating winding of the relay 59 will be energized when the relays 72, 73 and 74 have the respective contacts thereof closed. The winding is here shown connected across the phases A and C, but, obviously, other suitable phase connections may be resorted to.

The contacts 60 of the relay 59 control the energization of the closing coil 58 of the network switch 55. Under normal conditions, when the winding of relay 59 is energized, the circuit, including the closing coil 58, is completed, and the switch 55, if open, will be closed thereby, or, if closed, it will be maintained closed. The relay 59 constitutes, therefore, a low-voltage trip device for the switch 55. The switch 55 might be equally well controlled by a shunt trip device, but the low-voltage trip device only is illustrated herein by way of example.

As in the case of the switch 55, the network switch 56 is provided with a closing coil 58—A and a low-voltage relay 61 having contact members 62 which perform a function similar to that of the low-voltage relay 59. The network switch 56 may, of course, be equally well a shunt-tripped breaker, but the low-voltage trip device only is shown here.

After the network switch 55 has been closed by the action of the network relays 72, 73 and 74, the switch 57, cooperating with relay 92, serves not only to close the network switch 56 but also to maintain the network switches 55 and 56 closed so long as the direction of power flowing through the transformers 34 is from primary to secondary, which is the normal direction. In broad terms, the switch 57 is a means for helping to close the network switch 56 and for maintaining both switch 55 and 56 closed so long as normal conditions obtain.

As shown in Fig. 1, a network relay means 72, 73 and 74 is utilized to control, or to influence the control of both network switches 55 and 56. Instead of one relay means 72, 73 and 74 being associated with both switches 55 and 56, each switch may independently have an associated network relay means, as in the modification of this invention shown in Fig. 6.

The network relay means 72, 73 and 74 comprise three separate induction-relay elements energized from the phases A, B and C respectively, and controlling the contacts 75, 76 and 77 respectively. Only the relay element 72, associated with phase A, is shown in detail, inasmuch as the relays 73 and 74, corresponding to the phases B and C, are duplicates except for the phase connections. These relay elements may be of a usual type at present employed in alternating-current-distribution systems.

Instead of the three single-element network relays, each acting independently on separate discs, such as the disc 85 of relay 72, and controlling separate sets of contacts 75, 76 and 77, a polyphase relay acting upon a single set of contacts may be employed. Such a polyphase relay is described in copending application Serial No. 316,998, filed November 3, 1928, and assigned to Westinghouse Electric and Manufacturing Company.

Figure 4:
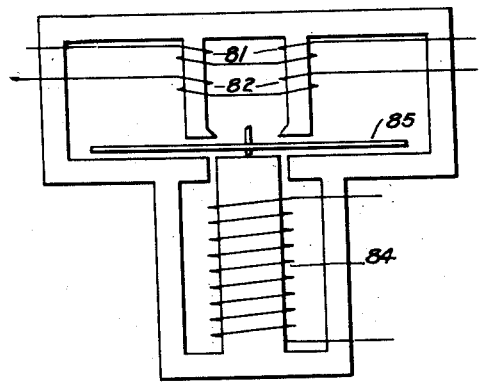
Fig. 4 is a view, in elevation, showing the internal circuits and structure of the operating magnet of a relay embodied in my invention.

Each relay element is provided with a current winding 81, a phasing winding 82 having in series therewith a phasing lamp 83, and a voltage winding 84. These windings cooperate, under certain conditions, to control induction discs 85 and, hence, the contacts 75, 76 and 77. The relation of these windings to the magnet structure of a relay of the usual type is illustrated in Fig. 4.

The current winding 81 of the relay 72, associated with phase A, is energized in accordance with the current traversing the conductor 63 by means of a saturable current transformer 71 or a reactive shunt or other suitable means.

The phasing winding 82 of the relay 72 is energized in accordance with a current produced by the voltage across the open contacts of the network switch 55. The purpose of the phasing lamp 83 is to provide a resistance means for automatically limiting the current traversing the phasing winding 82 in order to safeguard the winding from excessive current flow and in order to minimize the currents induced in the transformers 34 when the feeder-breakers 18 and the network-breakers 55 and 56 are open.

The voltage winding 84 of the relay 72 is energized in accordance with the network voltage by a circuit extending from the conductor 51 through the voltage winding, to ground.

The magnetic elements and electrical connections of the relays 73 and 74 are identical with those of the relay 72 except that they are energized from phases B and C, respectively.

The relays 72, 73 and 74, in this particular modification, are responsive to the electrical characteristics of only the main 22 supplying the lighting network. They control the action of the switch 55 directly, and indirectly control the network switch 56 through the cooperative action of the reverse energy relay 92 and the auxiliary switch 57, as more fully described hereinafter.

Broadly, the purpose of the set of relays 72, 73 and 74 is to close directly the network switch 55 when the conditions are such that the transformer banks 34 will supply energy to the network when the switch is closed; and to open the network switch 55 directly when conditions are such that energy is fed from the network into the transformer banks 34 through the network switch 55. In other words, the network relays 72, 73 and 74 are means for influencing the opening and closing of a network switch 55 in accordance with energy balance on the two sides of the switch 55.

The reverse-energy relay 92 constitutes a novel addition to this type of alternating-current-distribution system. In construction, it may be the ordinary reverse-energy or reverse-power relay responsive to the direction of resultant power flow through the transformers 34.

The purpose of the relay 92 is to maintain the network switches 55 and 56 in their closed positions when acting in conjunction with the auxiliary switch 57, so long as the direction of resultant power through the transformers 34 is from primary to secondary, or, in other words, so long as the direction of resultant power through the transformers 34 is toward the network.

Broadly stated, the reverse-energy relay 92, which is wattmetric in operation, constitutes means responsive to the direction of the resultant flow through the transformer bank 34, regardless of its particular connections to the system, and is arranged to close its contacts 95, and 97 when power flows in the normal direction, namely from the bus 11 to the network 12 or to the network 13 or to both; and to open its contacts 95 and 97 when resultant power flows in the reverse direction, namely, from the transformer bank 34 to the bus 11.

In greater detail, the relay 92 is of a usual construction comprising three magnetic elements A, B and C for association, respectively, with the three phases A, B and C; the three elements being substantially alike. The magnetic circuit of each element is energized by a current winding 93 and a voltage winding 94 which cooperate, according to the power direction through the transformers 34, to control an induction disc 96 and, hence, the movable contact member 97.

The current winding 93, corresponding to phase A, is energized in accordance with the current traversing the phase A in the primary circuit 33 of the transformers 34, and derives its energy from a special current transformer 91, to be described later.

The winding 93 may be energized, alternately, from the secondary mains at the different voltages by means of separate current transformers connected to such mains and having a special ratio in accordance with the differences in voltages to which they are respectively connected. This modification is illustrated and described in connection with Figure 7.

The potential or voltage winding 94 of phase A is preferably connected to the low-voltage secondary conductor 63, although it may be connected to the secondary conductor 66 supplying the power network 12; also it may be connected to the secondary of a voltage transformer (not shown) the secondary voltage of which is proportional to the primary voltage across the winding 35 of the transformer 34, to which the primary of the voltage transformer may be connected, when utilized.

The voltage windings 94 of phases B and C are correspondingly connected.

Broadly speaking, since the relay 92 is responsive to the direction of resultant power through the distribution transformers 34, any connections to produce this result are satisfactory.

The relay 92, preferably, has a restraining spring (not shown) to maintain the contacts 95 and 97 in open position when the relay is deenergized so that the network switches 55 and 56 will close by reason of the action of the network relays 72, 73 and 74 alone.

It may be observed that the relay 92 also serves to prevent "pumping" of the switches 55 and 56, when utilized in cooperation with the auxiliary switch 57.

It may be observed further that, in this particular modification, the relay 92 is responsive to power direction through the transformers 34, as a whole, whereas the network power-directional relays 72, 73 and 74 are responsive to power direction in one only of the secondary network switches, namely; the switch 55.

The current transformers 91 may be of a usual type employed for metering or instrument purposes and constructed to have a high degree of accuracy.

The ratios of the current transformers 91 are so proportioned, with respect to KVA rating of the transformers 34, that the current flowing in the secondary windings thereof, when the primary windings are energized only by the magnetizing current of the transformers 34, will be of such magnitude as to come within the range of sensitivity of the relay 92. In other words, with a relay 92 of given sensitivity, the ratio of the current transformers 91 is such as to deliver to the current windings 93 of the relay 92, sufficient current, in conjunction with the effectiveness of the potential windings 94, to operate the relay 92, and thus to close the contacts 95 when magnetizing energy of the transformers 34 is being fed into the primary windings 35 from the feeders 17.

In normal operation, there are two sequences of operation which may occur. Assuming the transformers 34 to be energized on the primary side 35, such voltage condition may exist on the secondary side 36 that, when the network switches 55 and 56 are closed, the transformers 34 will supply energy to the networks. In this case, the network relays 72, 73 and 74 will close their contacts 75, 76, 77 and cause the network switch 55 to close. Assuming that the contacts 95 of relay 92 were previously closed by reason of the flow of magnetizing current in the primary windings 35 of the transformers 34, the closing of the relay contacts 75, 76 and 77 of the network relays 72, 73, 74 will serve also to cause the network switch 56 to close, as may be seen from Figures 1 and 2.

When the network switch 55 is closed, the auxiliary switch contacts 57 are closed, and these contacts, in cooperation with the contacts 95 and 97 of the relay 92, serve to maintain the network switches 55 and 56 in the closed position during the continuous energization of the low-voltage relay operating coils 59 and 61. It may be observed that the contacts 57, 95 and 97 serve to completely short-circuit the network relay contacts 75, 76 and 77. Thus the contacts 95 and 97 of the reverse-power relay 92 must open before either of the network switches 55 and 56 may be tripped, and, since the contacts 95 and 97 will not open until the power flow through the transformer to the network has been reduced to a value less than the magnetizing current required by the transformers 34, or to zero, or until the direction of power flow through the transformers 34 is in the reverse direction, that is, from the network to the feeder, it may be seen that the network switches 55 and 56 are locked in their closed positions until such time as the resultant power flow through them is in the reverse direction.

In the tripping function, the first operation is the opening of the contacts 95 and 97 of the relay 92 in response either to no power being supplied in the primary windings 34 or to a fault on the feeder 33. When the contacts 95 and 97 open, the network switch 56 immediately trips in response to the deenergization of the low-voltage-relay-operating coil 61. Then, the network switch 55 will be tripped in response to the deenergization of the low-voltage-relay-operating coil 59. This deenergization of the low-voltage relays occurs when any one of the network-relay contacts 75, 76 and 77 opens by reason of the reverse-energy flow.

Figure 2:
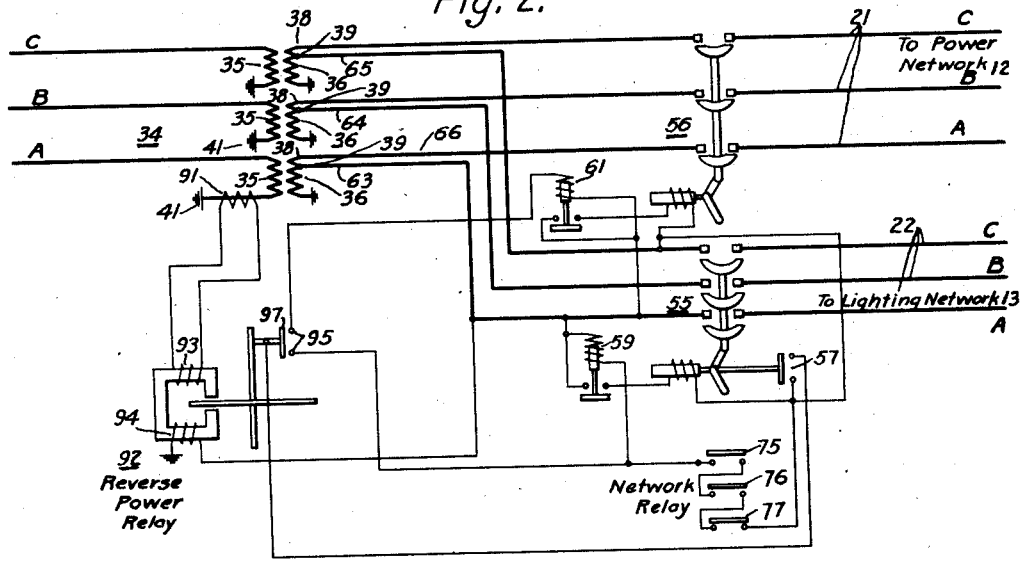
Fig. 2 is a schematic diagram of what is shown in Fig. 1.

The operation may be more readily understood by referring to Fig. 2 which is a schematic diagram of Fig. 1 and illustrates, in simple form, the connections between various elements of this invention.

From Fig. 2, it may be observed that this invention is primarily involved with a means for rendering the network-relay means ineffective when the network switch is closed. This result is accomplished by short-circuiting the contacts 75, 76, 77 of the network-relay means when the switch 55 is in closed position. Thus, when conditions are such that power will flow in the normal direction through the transformer bank 34, the reverse-power relay 92 will close its contacts 95, 97 and, likewise, the network-relay means 72, 73, 74 will close the associated contacts 75, 76 and 77, thereby closing the circuit to the relay 59. The relay 59, being energized, will close the switch 55, and the switch 55 mechanically will close the auxiliary switch 57. The contacts 97, 95 of the reverse-power relay 92 being closed and the auxiliary switch contacts 57 being closed, the contacts 75, 76, 77 of the network relay means are short-circuited and, consequently, render ineffective the network-relay means. The contact circuit thus established also serves to close the switch 56. Assuming that power through the transformer bank is in the normal direction, energy may now be transferred between the power network 12 and the lighting network 13, thus reversing the flow of power in the secondary main 21, and such condition will not cause a false operation of the network switch. To be sure, the network relay contacts associated with the secondary main which carries a reverse current will open, but such opening will be ineffective to control the opening of the switch 55 because the contacts 75, 76, 77 have now been rendered ineffective by the short-circuiting means, and, so long as the resultant power flow through the transformer 34 does not reverse, both switches 55 and 56 will remain closed.

If, however, the resultant power flows in a reverse direction through the transformer 34, the reverse-power relay 92 will open its contacts 95, 97, thereby deenergizing the relay 61 and thereby opening the switch 56. The network switch 55 will then be opened by reason of the action of the network-relay contacts 75, 76 and 77, which, by their action in opening, deenergize the relay 59.

This invention will, therefore, neutralize the effect of the so-called auto-transformer action or the transfer of energy between networks connected to a common transformer bank.

In Fig. 5 is illustrated an alternative means for energizing the current winding 93 in phase A of the power-directional relay 92. In this modification, the current winding may be energized in accordance with the current flow in the secondary mains 63 and 66 connected to the taps 38 and 39 of the secondary winding 36 of the distribution transformer 34. Connections for phases B and C may be made in a similar manner.

The winding 93 is supplied from the current transformers 101 and 102 associated with secondary-main conductors 63 and 66, respectively. The current transformers 101 and 102 may be of the usual instrument-transformer type having high accuracy over the normal range of operation.

The current transformers 101 and 102 are connected in parallel, and the arrangement is such that, when the power flow in both conductors 63 and 66 is in the normal direction, that is, from the transformer 34 to the networks, the current winding 93 is energized to produce a torque, in conjunction with the potential winding 94, to cause the closure of the relay contacts 95 and 97.

More specifically, when the currents $I_1$ and $I_2$ are traversing the conductors 66 and 63, the secondary currents $I_3$ and $I_4$ in the current transformers 101, 102 will flow in the direction indicated and will add vectorially to energize the winding 93.

The ratios of the current transformers 101 and 102 are such that substantially equal amounts of torque will be produced in the directional relay element 92 by equal amounts of power flowing in the secondary main conductors 63 and 66.

This construction is used in order that a transfer of energy from one secondary network to the other or to another network may be completely canceled out, in so far as the action of the directional relay 92 is concerned, and the action of the directional relay 92 may be controlled only by the sum total of energy into or out of the transformer secondary winding 36. The feature of this alternative scheme is the use of two current transformers 101, 102 of special ratio connected in parallel with each other and with the circuit of current winding 93 of the power-directional relay 92.

In Fig. 6, is illustrated schematically an alternative means and method of preventing the auto-transformer action which comprises the elements already described in connection with Fig. 1 and Fig. 2 except that auxiliary switches 57 and 57a are provided to be associated with each of the network switches 55 and 56, respectively, and also separate network relays 72, 73, 74 are provided to be connected to control each of the network switches 55 and 56.

The operation of the two switches 55 and 56 in this alternative plan differs from the operation of the switches heretofore described only in that each network switch 55, 56 is closed by its own set of network relays 72, 73, 74, whereas, in the scheme heretofore described, both switches 55 and 56 were closed by the action of only one set of network relays 72, 73, 74. Similarly, the tripping of each switch 55 and 56 is accomplished by means of its own set of network relays after these relays have been rendered free to trip the network switches by action of the directional relay 92 on reverse power.

After the switches 55 and 56 are closed, the contacts 75, 76, and 77 of both sets of relay means become short-circuited and rendered ineffective by reason of the circuit closed through the contacts 95 and 97 of the reverse power relay 92 and of the contacts 57 and 57a of the auxiliary switches associated with both network switches 55 and 56. Therefore, as long as power flows in a normal direction through the transformer 34, regardless of the direction of power in the secondary mains 21 or 22, the contacts 95 of the reverse-power relay 92 will remain closed and, also, the switches 55 and 56 will remain closed because the network-relay means associated with both switches 55 and 56 have been rendered ineffective by short-circuiting. However, should the normal direction of resultant power be reversed through the transformer 34, the contacts 95, 97 of the reverse-power relay 92 will open and thus permit the opening of both switches 55 and 56 through the action of the network-relay contacts 75, 76, 77.

Both Figs. 2 and 6, therefore, include means for rendering the network relays ineffective when the network switches are closed and should remain closed, and both have means for preventing so-called autotransformer action resulting from transfer of energy between networks connected to a common transformer bank.

Figure 7:
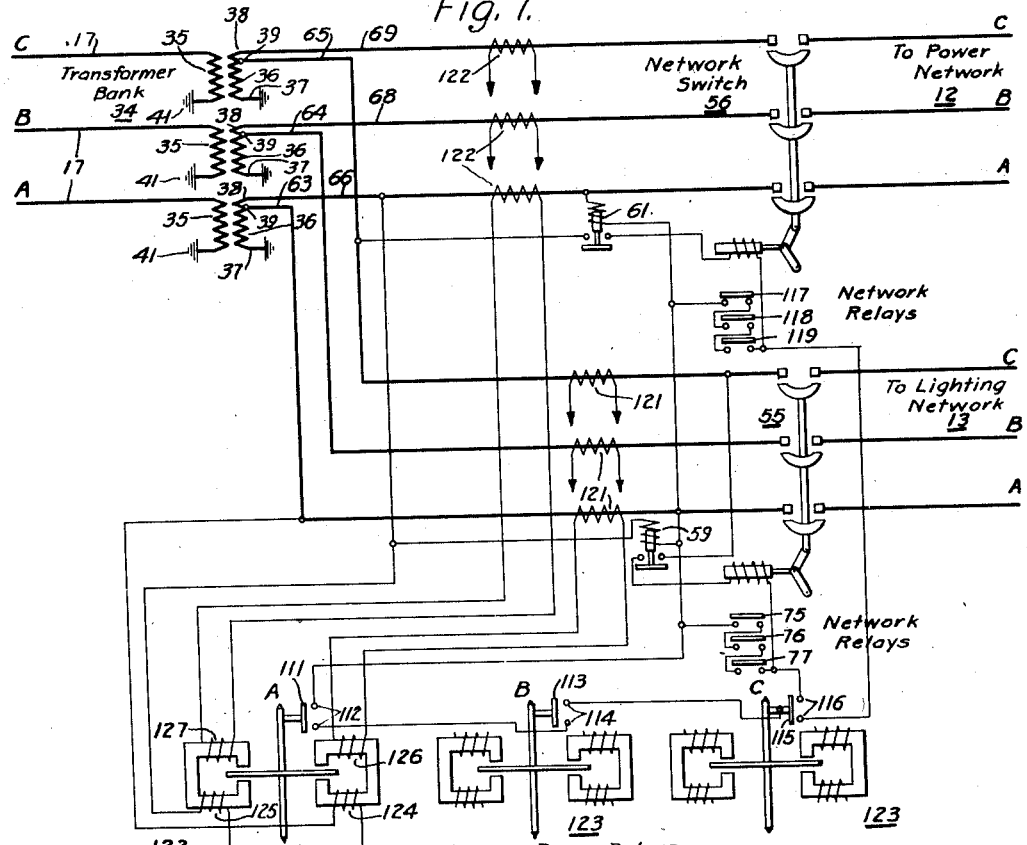
Fig. 7 is a diagram showing another modification of my invention.
Figure 8:
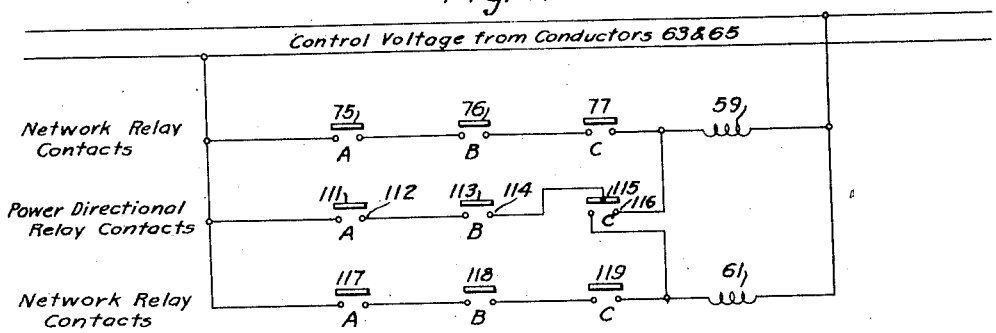
Fig. 8 is a line diagram schematically showing the contact connections of Fig. 7.

Referring to Figs. 7 and 8, another alternative scheme is disclosed which, in construction, is substantially the same as that heretofore described with reference to Figs. 1 and 2 except that no auxiliary switches 57 and 57a are employed and, instead of a single polyphase reverse-power relay, three single-phase power-directional relays are provided, each having two electromagnets acting upon a common disc controlling one set of contacts 111, 112, in phase A; contacts 113, 114 in phase B; and contacts 115, 116 in phase C. In each phase connection, as, for example, in phase A, one electromagnet is connected to be operated on power flow to the lighting network 13, the other on power flow to the power network 12.

There are also provided six current or series transformers 121 and 122, or two per phase, for energizing the current windings of the reverse-power relays.

These current transformers 121, 122 may be placed in the low-voltage secondary leads 63, 64, 65 and 66, 68, 69. The connections are shown for phase "A" only in Fig. 7; the connections to phases B and C being similar thereto.

The current transformers 121 and 122 may be of the instrument type of relatively high accuracy and may have equal ratios, instead of the special ratios of the current transformers heretofore described, by reason of the fact that the current coil in the relay associated with each current transformer acts in conjunction with a potential coil 124 or 125. These potential coils are energized by the voltages of the secondary mains associated with the current transformers and current coils, respectively.

The point to be emphasized is that the current transformers 121 and 122, the relay potential coils 124 and 125, and the relay coils 126 and 127, may be duplicates of each other. Therefore, each operating element, comprising a potential coil and a current coil, is subjected to the same wattage as the other operating element of the corresponding relay, although different values of voltage and current are applied to the elements separately from the secondary mains 63 and 66.

A normal direction of power flow to the networks over the feeder conductors 63, 66 tends to keep the contact members of the relays 123 closed, and, as long as the feeder 17 supplies power to either or to both networks 12 and 13, the reverse-power relays 123 will lock out the network relay means, thus preventing the occasional objectionable operation of either network switch 55 or 56 by reason of auto-transformer action. This lockout action is produced, as in the schemes heretofore described, by short-circuiting the contacts 75, 76, 77 and 117, 118, 119 of the network relay means when the resultant power flows through the transformer 34 in the normal direction.

If power flows through the transformers 34 in the reverse direction, the reverse power relays 123 will open their contacts, remove the short-circuit and permit the network relay means to open the network switches 55 and 56.

The detailed connections of the various network relay contacts, such as the contacts 75, 76, 77 in Fig. 1, are omitted in Fig. 7 for the sake of clarity.

In Fig. 8, however, is shown schematically the connections of the network-relay contacts for the 3-phase system, where 75, 76 and 77 represent the network-relay contacts for one network switch, such as 55 in Fig. 1, where 117, 118 and 119 represent the network-relay contacts for the network switch, such as 56 in Fig. 7, and 111, 112, 113, 114, 115, 116 represent the contacts of the three 2-element power-directional relays 123. It may be noted that there are three sets of contacts per phase, two in the respective network relays and one in the power-directional relay for each phase.

The connections of the network relay contacts to the low-voltage relay operating coils 59 and 61 are made in the usual manner and thus Fig. 8 merely shows the addition of the power-directional relay contacts 111 to 116 connected in such fashion as to shunt all the network relay contacts when all power-directional relay contacts are closed. It should also be noted that the contacts 111, 112, 113 and 114 are used merely to complete a single through circuit, no external connection being made to the moving contact member 111, but that the contacts 115, 116 are used in such fashion as to complete two circuits.

The difference in operation between this alternative scheme and that heretofore described lies in the fact that the closure of both network switches 55 and 56 is accomplished by the action of either set of network relays acting in conjunction with the power-directional relays. For example, the closing of the network relay contacts 75, 76, and 77 will energize the low-voltage operating coil 59 directly and thus cause network switch 55 to close. Upon such closure, the flow of power into the network will cause the closure of power-directional contacts 111 to 116 and thus cause the low-voltage operating coil 61 to become energized and thus network switch 56 will be closed.

Similarly, the network relay contacts, 117, 118, 119 of the network relays associated with network switch 56 will, by the closure thereof, energize the low-voltage operating coil 61 thus causing network switch 56 to close and indirectly, through the action of the power-directional relay, the contacts 115, 116 will cause the network switch 55 to close as a result of the energization of the low-voltage mechanism operating coil 59.

At this point, it should be observed that the power-directional relay contacts 115 and 116, associated with phase C of the two networks, by their action in closing, tie the network-switch-control circuits together in such fashion as to render the opening operation of both switches dependent upon the opening operation of both sets of network relays. The closing action of power-directional-relay contacts 111 to 116, associated with the power-directional relays connected to all three phases, renders the network switches independent of the network relays until such time as there is a reversal of power flow on at least one phase which will correspondingly open at least one set of the three power-directional-relay contacts.

The features of this alternative scheme are similar to those heretofore mentioned except that the auxiliary switches, such as the auxiliary switch 57, are omitted and, in place thereof, is substituted current transformers associated with each of the plurality of secondary mains, and a reverse-energy relay element associated with each of such current transformers, which results in an increase in the number of contacts associated with the relays. Therefore, the feature to be emphasized is the use of a distribution transformer supplying a plurality of networks at different voltages, current transformers associated with the plurality of networks, a plurality of corresponding network switches, and network-switch-controlling means including a reverse-energy relay or relays, the network switches being characterized by the omission of the auxiliary switches heretofore described.

Figure 9:
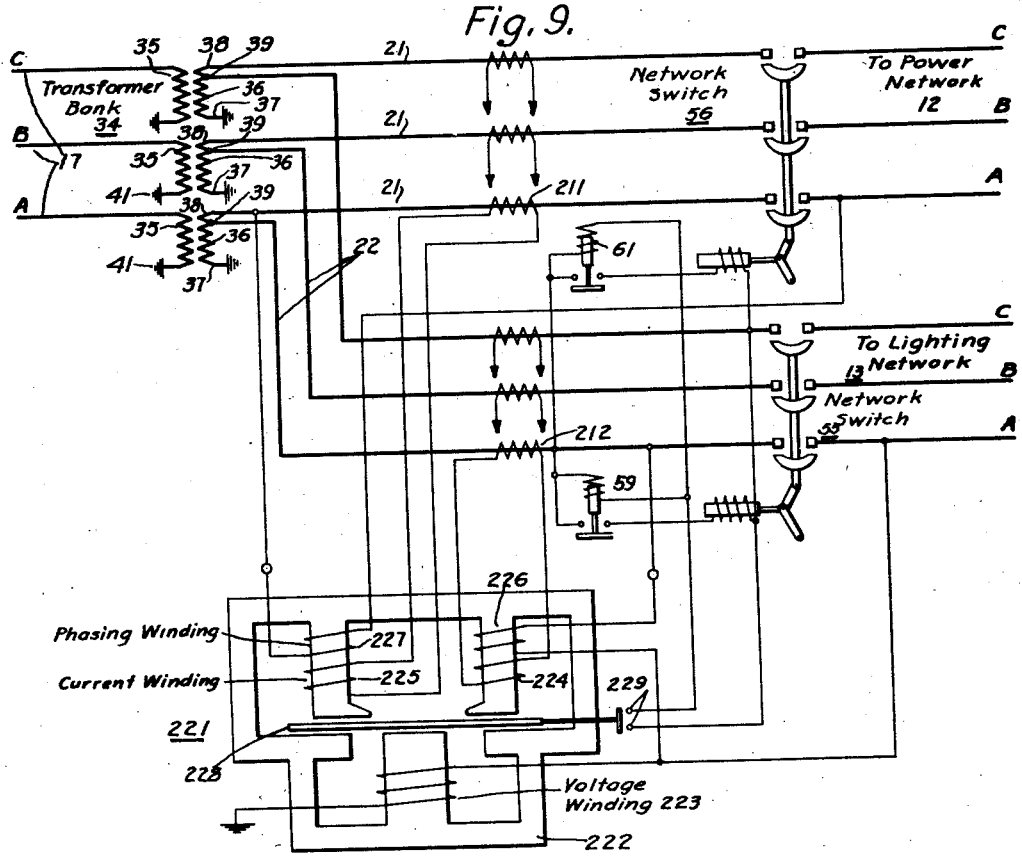
Fig. 9 is a diagram showing still another alternate system.
Figure 10:
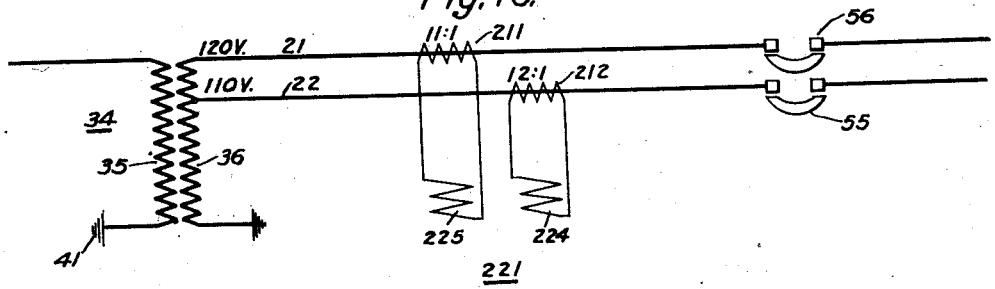
Fig. 10 is a line diagram showing, in simplified form, the relay connections shown in Fig. 9.

In Figs. 9 and 10 is illustrated still another alternative scheme for preventing improper action of the network switches 55 and 56 when a transfer of energy occurs between the networks 12 and 13 through the secondary winding 36 of the transformer bank 34.

This particular scheme utilizes a set of network relays having split-current and split-phasing windings to control the operation of both the lighting-network breaker 55 and the power network breaker 56 operating from the common transformer bank 34.

The scheme differs from the preceding variations in that the power-directional relay 92, is omitted, as well as auxiliary switches 57 and 57a. In place thereof, is substituted a set of current transformers 211 and 212 connected to a relay 221, the connections for phase A alone being illustrated, inasmuch as the connections of the phases B and C, may be duplicates of the phase A connections.

The network relay 221 may be of the usual induction type of construction having iron laminations 222 magnetized by a voltage winding 223, two current windings 224 and 225, and two phasing windings 226 and 227. The windings cooperate, under certain conditions, to control the movement of a disc armature 228 and the contacts 229 controlled thereby, and thus control the energization of the network switches 55 and 56 in a manner similar to that heretofore described.

In general, the functions of the network relay 221 are the same as those of the usual network relay described in the copending applications referred to, and includes both a synchronized closing feature and a reverse-power tripping feature. Particularly, however, the relays 221 of this invention have special current windings 224, 225 and phasing windings 226, 227 and also special connections and special ratios in relation to the current transformers 211 and 212, for accomplishing somewhat different functions.

The current or series transformer 211 is energized from the secondary main 21 and is utilized to energize the current winding 225 of the network relay 221. In a similar manner, the current transformer 212 is energized from the secondary main 22 and is utilized to energize the current winding 224 of the network relay 221.

The phasing winding 227 is connected to bridge the contact members of the network switch 56. Similarly, the phasing winding 226 is connected to bridge the main contacts of the network switch 55.

The relationship between the current transformers 211 and 212 and the current windings 224 and 225 of the network relay 221 are somewhat special, as may be observed from Fig. 10, wherein it is assumed that the secondary winding 36 of the transformer bank 34 has two tap windings 38 and 39 deriving voltage at 120 volts and 110 volts, respectively.

In such case, the relation of the ratio of current transformer 211 to that of current transformer 212 may be inversely as the voltages, to which they are respectively connected. The effect of the current windings 224 and 225 on the relay disc 228 in this case are assumed to be normally equal.

Instead of varying the ratio of the current transformers 211 and 212, as outlined in the preceding paragraph, the relay current windings 224 and 225 may be varied instead.

The object is to energize the current relay windings 224 and 225 of the relay 221 so that equal amounts of power flowing to the networks 12 and 13 over the secondary mains 21 and 22 will produce equal and like torques on the disc 228 and keep the contacts 229 in closed position. In such case, auto-transformer action will not cause the opening of the network switches 55 and 56 in response to a reversal of energy in one of the secondary mains 21 or 22, so long as the feeder 17 is energized, because the net flow of power from the feeder 17 to the networks 12 and 13 will produce a positive holding-in torque on the disc 228.

When the feeder is deenergized or a fault occurs relative to the feeder 17, the load currents resulting from the auto-transformer action will produce equal and opposite torques, thus leaving the relay free to open on the magnetizing current of the transformer bank 34 or on the reversed fault current, in accordance with the usual practice in systems of alternating-current distribution of this type.

The network switches 55 and 56 will, of course, close when the transformer bank 34 is in such condition as to supply power in a normal direction to either network 12 or 13 or to both of them.

This modification (Figs. 9 and 10), simply illustrates another means of preventing improper action of the network switches due to transfer of power or energy between the networks connected to a common transformer bank.

The principal advantages of my invention are: That proper operation of the network switches connected to a plurality of networks fed from a plurality of different voltages, obtained from the same transformer is insured; that unnecessary and improper operations of the network switches resulting from a transfer of energy from one network to the other because auto-transformer action is prevented; and that load fluctuations on either network will not cause unnecessary operation of the network switch connected to that network as long as there is power flow in the normal direction through the transformers to either or both networks.

Any changes or substitutions that may be made by a person skilled in the art are to be considered within the scope of the appended claims, except for such limitations as may be imposed by the prior art.

I claim as my invention:

1. In an alternating-current system of distribution, the combination with a feeder circuit-interrupter, a common transformer bank connected thereto for delivering low-voltage energy at a plurality of different voltages, a plurality of networks connected to the common transformer bank and energized at the different voltages, and network switches disposed between each network and the common transformer bank, of switch-controlling means including a directional relay responsive to the direction of resultant power through the transformer bank.

2. In an alternating-current system of distribution, the combination with a common transformer bank for delivering energy at a plurality of different voltages, a plurality of networks connected to the common transformer bank and energized at the different voltages, and network switches disposed between each network and the common transformer bank, of switch-controlling means including means such that the switches will remain closed during normal operation of the system when energy is transferred from one network to another and when the resultant power flow through the transformer bank is in the normal direction towards the networks.

3. In an alternating-current system of distribution, the combination with a common transformer bank for delivering energy at a plurality of different voltages, a plurality of networks connected to the common transformer bank and energized at the different voltages, and network switches disposed between each network and the common transformer bank, of switch-controlling means including network relays and supervising means for the network relays comprising a functionally separate wattmetric means.

4. In an alternating-current system of distribution, the combination with a common transformer bank for delivering energy at a plurality of different voltages, a plurality of networks connected to the common transformer bank and energized at the different voltages, and network switches disposed between each network and the common transformer bank, of switch-controlling means including means for maintaining the network switches closed when energy is transferred between the networks connected to the common transformer bank when the resultant power flow through the transformer bank is in the normal direction.

5. In an alternating-current system of distribution, the combination with a common transformer bank for delivering energy at a plurality of different voltages, a plurality of networks connected to the common transformer bank and energized at the different voltages, and network switches disposed between each network and the common transformer bank, of switch-controlling means including a directional relay having contact members controlled thereby for effecting the actuation of said switches, and means for short-circuiting the contact members to render the contact members ineffective when the associated network switches are closed.

6. In an alternating-current system of distribution, the combination with a common transformer bank for delivering energy at a plurality of different voltages, a plurality of networks connected to the common transformer bank and energized at the different voltages and network switches disposed between each network and the common transformer bank, of switch-controlling means including a network relay means for effecting the actuation of said switches and means including a power-directional relay for rendering ineffective the network relay means under predetermined conditions.

7. In an alternating-current system of distribution, the combination with a common transformer bank for delivering energy at a plurality of different voltages, a plurality of networks connected to the common transformer bank and energized at the different voltages, and network switches disposed between each network and the common transformer bank, of switch-controlling means including means for maintaining said switches in closed position only when power is being delivered from said transformer bank.

8. In an alternating-current system of distribution, the combination with a common transformer bank for delivering energy at a plurality of different voltages, a plurality of networks connected to the common transformer bank and energized at the different voltages, and network switches disposed between each network and the common transformer bank, of switch-controlling means including network relays and means for locking the network switches closed when the resultant power flow through the transformer bank is in the normal direction.

9. In an alternating-current system of distribution, the combination with a common transformer bank for delivering energy at a plurality of different voltages, a plurality of networks connected to the common transformer bank and energized at the different voltages and network switches disposed between each network and the common transformer bank, of switch-controlling means including a directional relay having contact members controlled thereby for effecting the actuation of said switches and means for short-circuiting the contact members of the directional relay when resultant power flow through the transformer bank is in the normal direction.

10. In an alternating-current system of distribution, the combination with a common transformer bank for delivering energy at a plurality of different voltages, a plurality of networks connected to the common transformer bank and energized at the different voltages, and network switches disposed between each network and the common transformer bank, of switch-controlling means including a network-relay apparatus operative to effect the actuation of said switches and means for rendering ineffective the network-relay apparatus when the associated network switch is closed and resultant power flow through the transformer bank is in the normal direction.

11. In an alternating-current system of distribution, the combination with a plurality of load circuits energized at different voltages, a plurality of transformers for energizing the load circuits at the different voltages, and a circuit interrupter between each network and each transformer, of interrupter-controlling means including a network relay and a reverse-energy relay responsive to direction of resultant power flow through the transformer.

12. In an alternating-current system of distribution, the combination with a plurality of networks, a bank of transformers for energizing the networks, and a network switch between each network and the bank, of switch-controlling means including a network relay and a functionally separate reverse-energy relay responsive to direction of resultant power flow through the bank.

13. The combination with a transformer bank having tapped low-voltage secondary windings for energizing a plurality of secondary networks at different voltages, and network switches connected between each network and the transformer bank, of switch-controlling means including current transformers energized in accordance with current associated with the transformer bank and network-relay apparatus operative to effect the actuation of said switches, and means for rendering said apparatus ineffective to transfer of energy between the networks when the resultant power flow through the transformer bank is in a direction from the feeder toward the network.

In testimony whereof, I have hereunto subscribed my name this 17th day of December, 1928.

WILLIAM KNOX SONNEMANN.